July 16, 1929.  G. D. RABUN  1,721,133

ELECTRICALLY OPERATED TRACK SWITCH

Filed Aug. 10, 1925  2 Sheets-Sheet 1

GEORGE D RABUN
By John L. Milton
Attorney

Patented July 16, 1929.

1,721,133

UNITED STATES PATENT OFFICE.

GEORGE D. RABUN, OF LOUISVILLE, KENTUCKY, ASSIGNOR TO CHEATHAM ELECTRIC SWITCHING DEVICE COMPANY, OF LOUISVILLE, KENTUCKY.

ELECTRICALLY-OPERATED TRACK SWITCH.

Application filed August 10, 1925. Serial No. 49,293.

My invention relates to electrical systems and particularly to that class of systems adapted to automatically position the track switch from a moving vehicle so that the vehicle will be switched in a predetermined position at the will of the operator of the vehicle.

An object of my invention is to apply current to certain operating parts for limited time periods and prevent the continued application of current so as to avoid injury to certain parts from excessive application of current and thereby prevent the burning out of said parts.

Another object of my invention is to permit the application of the operating current to certain parts for a sufficient time to saturate certain solenoids or other electrical means which moves the track switch.

The system is so arranged that the track switch may be operated by the motorman when he reaches a certain pre-determined point by placing his controller in the "on" position. Passage of a car past this pre-determined point with the controller in the "on" position causes the operating parts of the track switch to be moved to the opposite position. No current is applied to the operating mechanism of the track switch when vehicle passes this pre-determined point with controller in "off" position. Therefore, it is apparent that there is a pre-determined time for the application of current to the track operating coils since vehicle is always in motion when controller is in "on" position.

Further objects and advantages of my invention will disclose themselves to those skilled in the art as the further description of my invention proceeds, and when read in conjunction with the drawings accompanying this specification.

Figure 1:
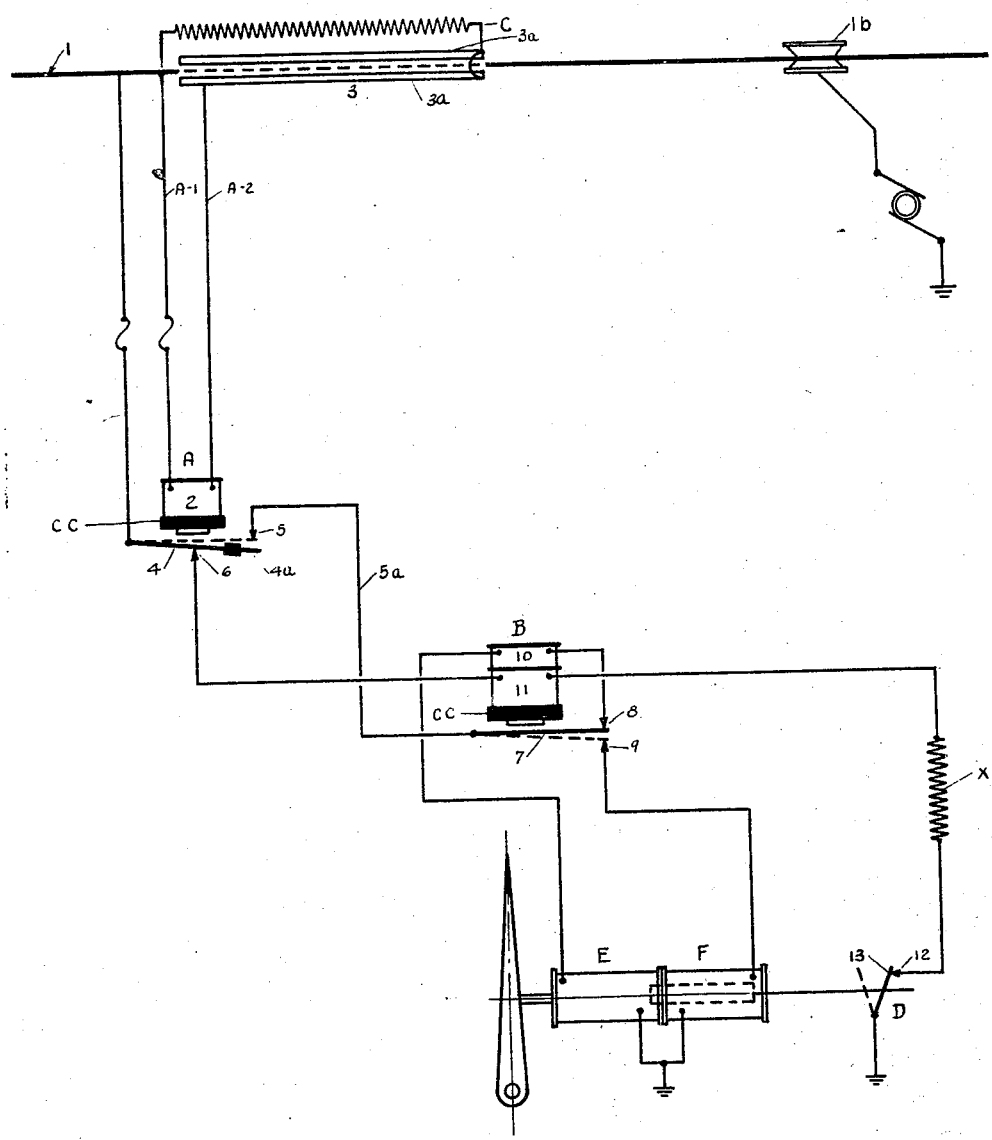
Fig. 1 is a diagrammatic view in the preferred form showing parts and circuits which effects the track throwing system herein described, or by means of which the track throwing system may be operated.

Contactor 3 is constructed so that strips $3^a$, $3^a$, are insulated and separate away from the trolley wire 1. As the trolley wheel $1^b$ contacts said strips it is depressed away and out of contact with the trolley wire. These strips are connected to the trolley wire, which is the source of current, by means of the resistor C mounted preferably on the contactor and by the winding 2 of solenoid A. These two connections are arranged in multiple so that current flowing from trolley wire 1 to the strips will pass through trolley wheel and motors to the ground return, the current taking a multiple path from trolley wire to the contactor strips $3^a$, $3^a$. This is arranged so that the full car current is not carried through the connecting wires $A^1$, $A^2$ or the solenoid A. The resistor C is proportioned so that the heat will be dissipated and thereby prevent burning of the lead wires and winding 2.

D is a circuit controller and is mechanically connected to the track switch tongue and to the plunger of the track magnets E and F, the latter furnishing the motive power for shifting the switch tongue from one position to the other. These parts are so constructed and connected that the switch tongue in one position closes contact points 12 and 13. When the switch is thrown in the opposite direction these contact points are opened. Attention is called to the fact that this is true whether the switch point is thrown electrically or manually.

As trolley wheel $1^b$ contacts the contactor 3 with "power on" coil 2 of solenoid A is energized, and its armature lifted to effect contact between points 5 and $4^a$ of armature 4. The current now travels from trolley wire through resistor C and in multiple through coil 2 in relay A, to strips of contactor 3, to trolley wheel through the wheel, motor to the ground return. Closing of contacts $4^a$, 5 establishes a circuit from trolley 1, through armature 4, wire $5^a$, through armature 7, to contact 8 or contact 9 according to position of armature 7. The position of armature 7 is controlled by coil 11 in relay B, which in turn is either energized or not according to the position of circuit controller D. If circuit controller is in position for contacts 12 and 13 to be closed, coil 11 will be energized and armature 7 will make contact with point 8 and current will go through armature 7, point 8, through holding coil 10 in relay B, through operating magnet E to ground, thereby energizing this coil and throwing the switch point and circuit controller to the opposite position. It will be noted that armature 4 of solenoid A will remain in front contact for a predetermined time period after traveling contact element 1^b disengages contactor 3 due to the presence of the choke coil or closed conductor C. C.

If circuit controller is in position so that contacts 12 and 13 are not closed, relay coil 11 will not be energized and armature 7 would make contact with point 9, therefore, current would flow from armature 7 to contact 9, through operating coil F to ground thereby energizing F and throwing switch point and circuit controller in such a position that at the end of the operation contacts 12, 13 would be closed.

Relay B is so constructed and connected that armature 7 will not change its original position while armature 4 is raised to make contact with point 5. Special attention is called to this feature as it is essential to successful operation of the device. This is accomplished by having contact between armature 4 and contact point 6 open when armature 4 is lifted to make contact with point 5. The opening of contacts 4 and 6 opens the circuit through coil 11 in relay B. If position of circuit controller D is such that coil 11 is energized, armature 7 would be picked up. Opening contacts 4, 6 would deenergize coil 11, however, this relay is so constructed with a copper choke coil c. c., so that it is slow acting and therefore armature 7 would not pull away from contact 8 until contacts 4^a, 5 are closed. It is then prevented from falling away due to the fact that current goes through armature 4, contacts 4^a, 5, armature 7, contact 8, coil 10 to operating coil E. Coil 10 in relay B will then be energized and thereby hold armature 7 against contact 8 as long as contacts 4^a, 5 are closed.

Should coil 11 be de-energized, due to the circuit controller D being open at the time armature 4 is picked up, the path through coil 11 would be maintained open as long as the armature 4 remains up. Therefore, upon the pick-up of armature 4, or relay A, armature 7 in relay B will remain in the position prior to this pick-up of armature 4 until said armature is released and falls back to its original position.

Figure 2:
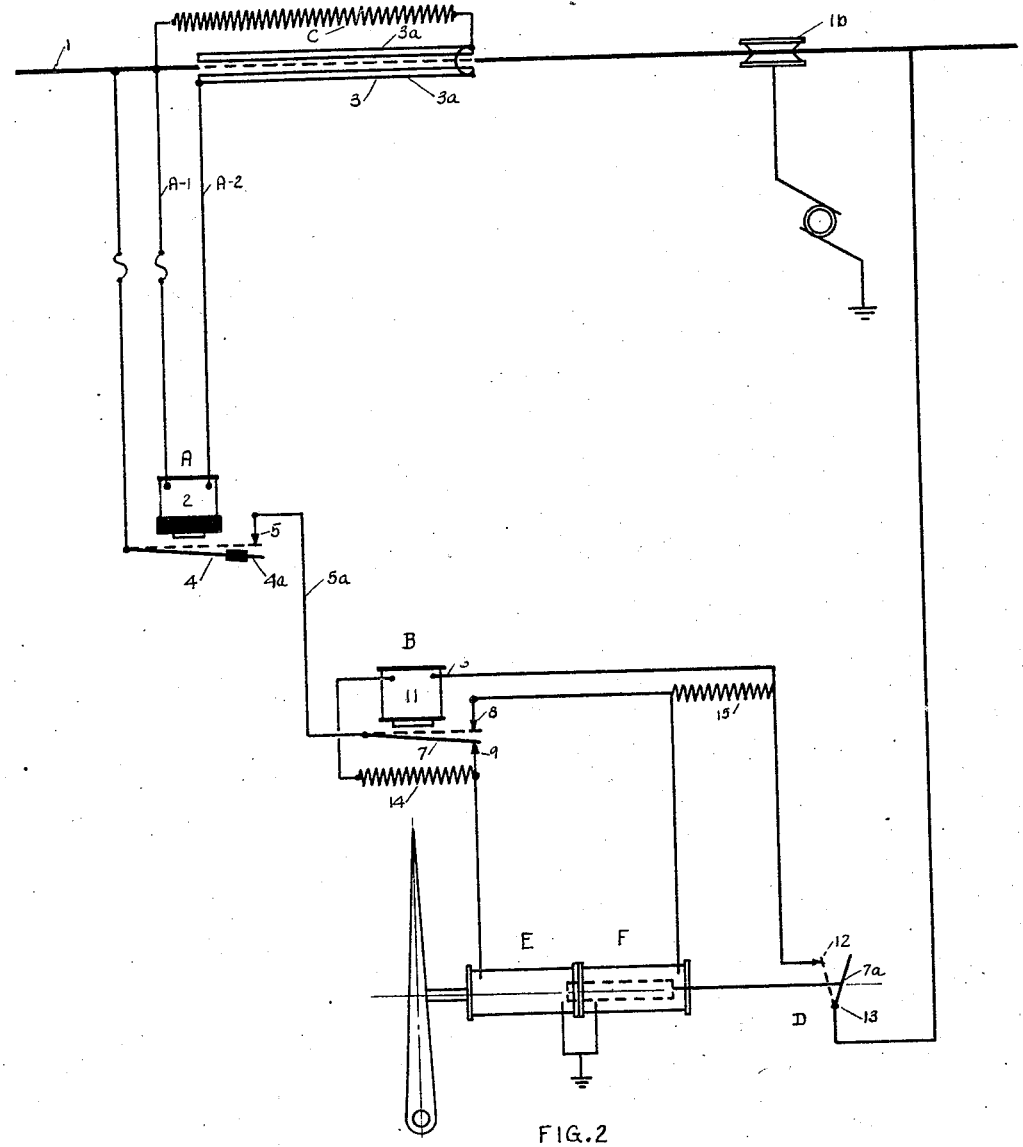
Fig. 2 is a modified form of the same invention.

Fig. 2 corresponds to Fig. 1 except in the method of preventing a change in position of armature 7 while armature 4 is closed against contact 5. The method of accomplishing this consists of connecting switch blade 7^a of circuit controller D to trolley 1 instead of to ground and having one terminal of coil 11 in relay B connected through resistor 14 to operating coil E and to contact 9 and the other terminal through resistor 15, coil F and to contact 8 as shown.

Resistances 14 and 15 being of such values that if either one is in series with coil 11 of relay B and coil E or coil F between trolley and ground, armature 7 of relay B will pick up against contact 8, and also of such values that if both are in series with coil 11 and either coil E or F between trolley and ground, armature 7 would not pick up, but if already picked up against contact 8, would remain up till source of power is removed, the variation between current which is required to pick armature 7 up and the current required to hold armature 7 up making such arrangement of resistors possible.

If circuit controller D is so thrown that contacts 12, 13 are opened as shown, coil 11 will not be energized and armature 7 will be dropped against contact 9. The closing of contacts 4^a, 5 causes current to flow through armature 7 to contact 9 and through coil E which would throw switch point in opposite position and close contacts 12, 13. Armature 7 is prevented from picking up during this flow of current due to the fact that point 9, resistor 14, terminal 6 and coil 11 are of the same potential when contacts 12, 13 are closed. At the beginning of this operation there would be a current flow from armature 7 through point 9, resistor 14, coil 11, resistor 15, coil F to return or ground, however, due to the high resistance in the circuit, coil 11 will not pick up armature 7.

If controller D is in such a position that contacts 12, 13 are closed, coil 11 would be energized by flow of current from trolley 1, through contacts 12, 13, coil 11, resistor 14, coil E to ground. Upon closing contacts 4^a, 5, coil F would be energized and switch tongue, together with circuit controller would be thrown in opposite position. Armature 7 is prevented from falling upon the opening of contacts 12, 13 due to the circuit from armature 7 through point 8, resistor 15, coil 11, resistor 14, coil E to ground. This circuit, while too high a resistance to pick up armature 7 is low enough to prevent armature from falling if already picked up.

Having thus described the invention, what I claim as new is:—

1. In an electrical track switch controlling device, in combination, a source of power, a contactor for engagement by the traveling contact element of a car, a switch operating relay and a shunt resistor, a circuit selecting relay having front and back contacts and an operating and a holding coil, a circuit extending from the source of power to the contactor through the operating coil of the switch operating relay and through a shunt resistor, and a divided switch operating circuit having the front contact and the holding coil of the circuit changing relay in one of its branches and having the back contact of the circuit selecting relay in another branch thereof.

2. In an electrical track switch controlling device, in combination with a contactor and the traveling contact element of a car co-operating therewith, of a switch operating relay closed by the engagement of the said traveling contact element with the contactor and means controlled by said relay for applying current to said switch device for a predetermined interval after disengagement of said traveling contact element and said contactor.

3. In an electrical track switch controlling device, in combination with a contactor and the traveling contact element of a car co-operating therewith, of a switch operating relay closed by the engagement of the said traveling contact element with the contactor and means for applying current to said switch device for a predetermined interval after disengagement of said traveling contact element and said contactor, and an auxiliary switch operating circuit selecting relay in circuit therewith.

4. In an electrical track switch controlling device, in combination with a contactor and the traveling contact element of a car co-operating therewith, of a switch operating circuit closed by the engagement of the said traveling contact element with the contactor, means for applying current for a predetermined interval after disengagement of said traveling contact element and said contactor, and an auxiliary switch operating circuit selecting relay controlled by a switch synchronously operated by the armature of said electric track switch operating device.

5. In an electrical track switch controlling device, in combination with a contactor and the traveling contact element of a car co-operating therewith, of a switch operating relay in shunt circuit with a resistor closed by the engagement of the said traveling contact element with the contactor, means controlled by said relay for applying current for a predetermined interval after disengagement of said traveling contact element and said contactor and an auxiliary switch operating circuit selecting relay controlled by a switch synchronously operated by the armature of said electric track switch operating device.

6. In an electrical track switch controlling device, in combination with a contactor and the traveling contact element of a car co-operating therewith, of a switch operating relay closed by the engagement of the said traveling contact element with the contactor, means controlled by said relay for applying current for a predetermined interval after disengagement of said traveling contact element and said contactor, and an auxiliary switch operating circuit selecting relay controlled by a switch synchronously operated by the armature of said electric switch operating device, said circuit changing relay being provided with an operating coil in circuit with the switch which is operated by the armature of said electrical operating device.

7. In an electrical track switch controlling device, in combination with a contactor and the traveling contact element of a car co-operating therewith, of a switch operating relay closed by the engagement of the said traveling contact element with the contactor, means controlled by said relay for applying current for a predetermined interval after disengagement of said traveling contact element and said contactor, and an auxiliary switch operating circuit changing relay controlled by a switch synchronously operated by the armature of said electric switch operating device, said circuit changing relay being provided with a holding coil connected to its front contact and one coil of the switch operating device.

In testimony whereof I affix my signature.

GEORGE D. RABUN.